US011172436B2

(12) United States Patent
Casati et al.

(10) Patent No.: US 11,172,436 B2
(45) Date of Patent: Nov. 9, 2021

(54) SUPPORT OF NOMADIC OR FIXED USERS IN A MOBILE NETWORK

(71) Applicant: Alcatel Lucent, Boulogne Billancourt (FR)

(72) Inventors: Alessio Casati, Swindon (GB); Nicolas Drevon, Nozay (FR); Sudeep Palat, Swindon (GB)

(73) Assignee: Alcatel Lucent, Nozay (FR)

( * ) Notice: Subject to any disclaimer, the term of this patent is extended or adjusted under 35 U.S.C. 154(b) by 0 days.

(21) Appl. No.: 14/429,021

(22) PCT Filed: Sep. 18, 2013

(86) PCT No.: PCT/EP2013/069350
§ 371 (c)(1),
(2) Date: Mar. 18, 2015

(87) PCT Pub. No.: WO2014/044701
PCT Pub. Date: Mar. 27, 2014

(65) Prior Publication Data
US 2015/0230166 A1 Aug. 13, 2015

(30) Foreign Application Priority Data
Sep. 18, 2012 (EP) .................................. 12306127

(51) Int. Cl.
*H04W 48/18* (2009.01)
*H04W 36/12* (2009.01)
(Continued)

(52) U.S. Cl.
CPC ............. *H04W 48/18* (2013.01); *H04W 8/08* (2013.01); *H04W 36/12* (2013.01);
(Continued)

(58) Field of Classification Search
None
See application file for complete search history.

(56) References Cited

U.S. PATENT DOCUMENTS

2011/0170469 A1   7/2011  Watfa et al.
2011/0286410 A1 * 11/2011  Zembutsu et al.
(Continued)

FOREIGN PATENT DOCUMENTS

EP    2 217 025 A1    8/2010
TW    201146046 A1   12/2011
(Continued)

OTHER PUBLICATIONS

Konstantinos Samdanis et al., "Traffic Offload Enhancements for eUTRAN," IEEE Communications Surveys & Tutorials, vol. 14, No. 3, Third Quarter, pp. 884-896, XP011454973, 2012.
(Continued)

*Primary Examiner* — Mariela Vidal Carpio
(74) *Attorney, Agent, or Firm* — Fay Sharpe LLP

(57) ABSTRACT

A method is described for the support of nomadic or fixed users in a mobile network. The mobile network may include a Core Network CN accessed by a Radio Access Network RAN. The mobile network may provide connectivity, referred to as PDN connectivity, between an User Equipment UE and at least one external network, referred to as Packet Data Network PDN, via a selected one of mobile network nodes associated with the PDN and referred to as PDN Gateway PDN GW. The method may include support of a nomadic or fixed user in a mode of operation referred to as non-mobile mode of operation wherein the selected PDN GW, referred to as local PDN GW, is co-located with a RAN node serving the UE, based on knowledge of the user's mobility pattern.

3 Claims, 3 Drawing Sheets

(51) Int. Cl.
*H04W 8/08* (2009.01)
*H04W 64/00* (2009.01)
*H04W 88/16* (2009.01)
*H04W 36/32* (2009.01)
*H04W 8/18* (2009.01)
*H04W 8/22* (2009.01)
*H04W 8/24* (2009.01)
*H04W 84/04* (2009.01)
*H04W 8/20* (2009.01)

(52) U.S. Cl.
CPC ............ *H04W 64/006* (2013.01); *H04W 8/18* (2013.01); *H04W 8/20* (2013.01); *H04W 8/22* (2013.01); *H04W 8/24* (2013.01); *H04W 36/32* (2013.01); *H04W 84/045* (2013.01); *H04W 88/16* (2013.01)

(56) References Cited

U.S. PATENT DOCUMENTS

| | | | |
|---|---|---|---|
| 2012/0076121 A1* | 3/2012 | Choi et al. | |
| 2012/0189016 A1* | 7/2012 | Bakker et al. | |
| 2012/0195287 A1* | 8/2012 | Jung | H04L 1/1858 370/331 |
| 2012/0257598 A1* | 10/2012 | Karampatsis et al. | |
| 2012/0300750 A1* | 11/2012 | Chin et al. | |
| 2013/0003699 A1* | 1/2013 | Liu et al. | |
| 2013/0208661 A1* | 8/2013 | Nylander | H04W 48/18 370/328 |
| 2014/0204909 A1* | 7/2014 | Cheng et al. | |
| 2014/0323137 A1* | 10/2014 | Graffagnino | |
| 2015/0215978 A1* | 7/2015 | Casati | H04W 76/022 370/329 |
| 2015/0223190 A1* | 8/2015 | Backman | H04W 64/003 370/328 |
| 2015/0282082 A1* | 10/2015 | Landais | H04W 52/0222 370/311 |

FOREIGN PATENT DOCUMENTS

| | | |
|---|---|---|
| WO | WO 2006/073816 A2 | 7/2006 |
| WO | 2009141686 A1 | 11/2009 |
| WO | WO 2010/127441 A1 | 11/2010 |
| WO | 2011028258 | 3/2011 |
| WO | WO 2012/050493 A1 | 4/2012 |

OTHER PUBLICATIONS

International Search Report for PCT/EP2013/069350 dated Nov. 6, 2013.

* cited by examiner

SUPPORT OF NOMADIC OR FIXED USERS IN A MOBILE NETWORK

The present invention generally relates to mobile communication networks and systems.

Detailed descriptions of mobile communication networks and systems can be found in the literature, such as in particular in Technical Specifications published by standardization bodies such as for example 3GPP ($3^{rd}$ Generation Partnership Project).

Examples of packet mobile communication systems include Evolved Packet System EPS (specified in particular in 3GPP TS 23.401, UMTS (specified in particular in 3GPP TS 23.060), . . . etc.

EPS network (for example), comprises a Core Network (CN) called Evolved Packet Core called EPC that can be accessed by a Radio Access Network (RAN) called E-UTRAN. An example of architecture of EPS network is recalled in FIG. 1 (taken from 3GPP TS 23.401).

EPS network provides IP connectivity (referred to as PDN connectivity) between an User Equipment UE and at least one external IP network (referred to as Packet Data Network PDN). Examples of PDN include Internet, Intranet, operator's IP network, . . . etc. Connectivity to a PDN is provided via a selected one of EPS network nodes associated with the PDN and referred to as PDN Gateways PGW. The selected PGW provides functionalities such as UE IP address allocation, policy enforcement, charging support . . . etc. The selected PGW is the anchor (or termination) point of an IP data session created in the EPS network for the PDN connection. The selected PGW is usually located in the Core Network, requiring UE mobility support during the IP data session anchored at the selected PGW, and transport of user data for said session in the Core Network between the selected PGW and a serving eNodeB (eNB) in E-UTRAN.

There are similar concepts in systems other than EPS, for example UMTS.

As recognized by the inventors and as will be described later, mobile networks and systems have been designed for users that are assumed to be really mobile, and are not optimized (particularly in terms of complexity and cost) for users that are not really mobile. Examples of such users include nomadic users (which can change place in a non-frequent way), and fixed users (which cannot change place). Examples of nomadic User Equipments include smartphones mainly used at home or office, . . . etc. Examples of fixed User Equipments include some M2M (Machine To Machine) devices such as for example vending machines . . . etc. There is a need for optimization of mobile networks and systems, in particular for such nomadic or fixed use. More generally, mobile networks and systems improvements are needed, to bring more benefits to operators and/or users.

Embodiments of the present invention in particular address such needs.

These and other objects are achieved, in one aspect, by a method for the support of nomadic or fixed users in a mobile network.

In an embodiment, said mobile network comprising a Core Network CN accessed by a Radio Access Network RAN, and said mobile network providing connectivity referred to as PDN connectivity between an User Equipment UE and at least one external network referred to as Packet Data Network PDN, via a selected one of mobile network nodes associated with said PDN and referred to as PDN Gateway PDN GW, said method includes support of a nomadic or fixed user in a mode of operation referred to as non-mobile mode of operation wherein said selected PDN GW referred to as local PDN GW is co-located with a RAN node serving said UE, based on knowledge of the user's mobility pattern.

These and other objects are achieved, in another aspect, by a method for the support of fixed users in a mobile network.

In an embodiment, said mobile network providing connectivity to an User Equipment UE and comprising at least one Core Network CN node having control plane functions, said control plane functions including interacting with said UE in the control plane, said method comprises a step of:
said UE indicating to said CN node if the user is a fixed user.

These and other objects are achieved, in another aspect, by a method for the support of nomadic users in a mobile network.

In an embodiment, said mobile network providing connectivity to an User Equipment UE and comprising at least one Core Network CN node having control plane functions, said control plane functions including interacting with a Radio Access Network RAN node in the control plane, said method comprises a step of:
said RAN node informing said CN node of an estimated user's mobility pattern.

These and other objects are achieved, in other aspects, by entities configured to carry out such method(s), said entities including, in particular (though not exclusively), User Equipment UE, and mobile network nodes such as:
RAN node (such as eNodeB for E-UTRAN, or RNC for UTRAN),
CN node having control plane functions (such as MME for EPS, Gn-SGSN for UMTS CN based on GPRS, S4-SGSN for UMTS CN based on EPC),
PDN Gateway (such as PGW for EPS, GGSN for UMTS CN based on GPRS, or PGW for UMTS CN based on EPC).

Some embodiments of apparatus and/or methods in accordance with embodiments of the present invention are now described, by way of example only, and with reference to the accompanying drawings, in which.

Figure 1:
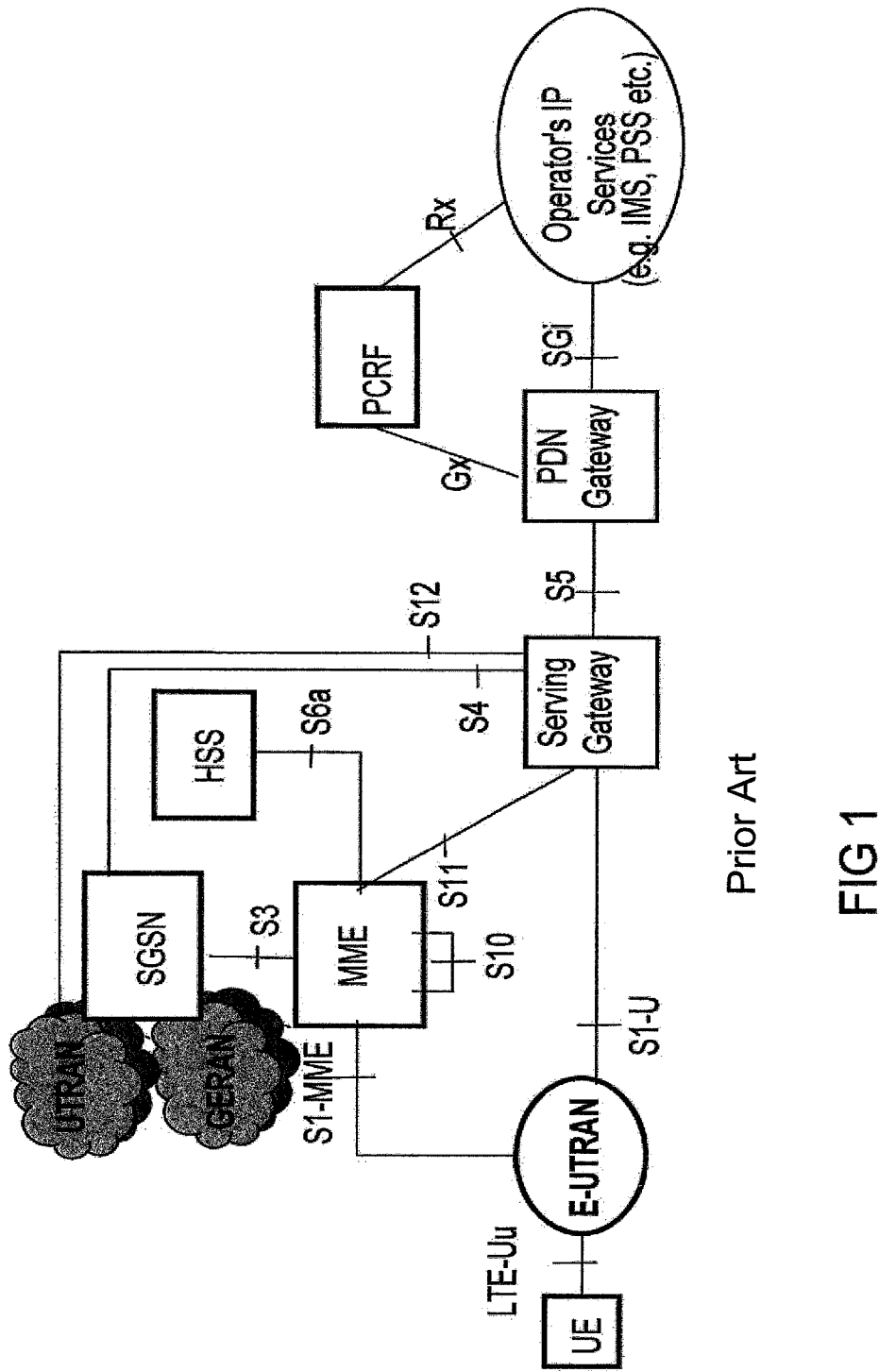
FIG. 1 is intended to recall an example of architecture for EPS network.

Embodiments of the present invention are based in particular on following ideas:
A large percentage of users on a mobile (or cellular) network are nomadic for most of the time and not really mobile, e.g. use of smartphones at home and office.
Many of the devices cater more to a nomadic or fixed use than mobile e.g. laptops, tablets, stationary M2M devices like sensor networks, vending machines . . . etc.
Even when the users are mobile, all or many of the services that they use are able to survive a change of IP address e.g. web browsing
Functions within the network that support mobility may not be critical for these types of usage of the network.
Most internet services that get used in such scenarios like web browsing, streaming, many M2M services, can be made to work fine with best effort connection and may not require sophisticated charging and QoS support.

It would be good to optimize cellular network architecture for such use, e.g. to minimize the number of core network nodes and global costs.

Such optimization could be equivalent to providing users a cellular connection similar in functionality to a Wi-Fi connection at a hotspot.

Current mobile networks and systems are not optimized for such nomadic or fixed use, in particular PDN Gateway selection (such as PGW selection in EPS) is not optimized based on the mobility pattern of the UE.

There is a possibility, from 3GPP Release 10, to use Selected IP traffic offload (SIPTO), which relies on a selection of a gateway GW above the RAN node in UTRAN (in UMTS) or EUTRAN (in EPS). However such optimization just pertains to the routing of traffic depending on the Access Point Name APN, so that it is more optimal, but not really an overall system optimization, in particular because it assumes that the UE is moving and that the IP addresses allocated to the UE by the PGWs need to be preserved; i.e. this is not optimized for UEs that are nomadic where IP addresses don't need to be preserved when the UE changes cell or serving RAN node (including UEs that don't physically move such as vending machines etc).

In embodiments of the present invention, in order to optimize the network for the support of nomadic or fixed users, a new mode of operation, referred to as non-mobile mode of operation, is introduced in the network, in addition to the existing mode of operation which will also be referred to as regular, or mobile, mode of operation.

Embodiments for such non-mobile mode of operation will be more detailed in the following, by way of example for EPS. However the present invention is not limited to EPS, and would apply to other systems such as for example UMTS.

A non-mobile mode of operation is introduced in the network in the EUTRAN. In this non-mobile mode of operation, a PGW co-located with the serving eNB is selected, based on knowledge of the user's mobility pattern. In other words, in this non-mobile mode of operation, the termination point of IP data sessions is the eNB (as if the PGW and SGW were collapsed in the eNB). Co-located eNB, SGW, PGW (also noted eNB/SGW/PGW) can be represented as a single physical node (as represented for example in FIGS. 2 and 3). The UE IP address is locally assigned. The non-mobile mode of operation may be associated to specific Access Point Names APNs. A same APN may be handled in non-mobile mode, or in regular mode (i.e. with a selected PGW in the mobile Core Network) depending on estimation of the current UE mobility pattern by the network.

At any given time therefore the UE can be served either by a PGW in the Mobile Operator Network—MON (i.e. a PGW located in the mobile Core Network), or by a PGW/SGW (PGW/SGW meaning a combination of PGW and SGW) collocated with the eNB, based on knowledge of the mobility pattern of the UE (or user).

Knowledge of the user's mobility pattern may be obtained by various ways.

For example, the network may estimate the mobility pattern of the UE.

For example, it can be considered that a nomadic user may be in one or other of two mobility states, one mobility state referred to as moving state wherein said nomadic user is moving, and one mobility state, referred to as stationary state wherein said nomadic user is not moving for at least a given period of time (i.e. significant time), For example, an user may be considered as fixed user if it has indicated it to the network or if the mobile subscriber database indicates that the user is a fixed user. A fixed user may be considered as in the stationary state in the network.

The network may estimate whether the UE is "stationary" (i.e. not moving or staying long in the same cell and/or served by same eNB), or "moving" (i.e. not staying long in the same cell and/or served by the same eNB).

For example, the eNB may detect whether the UE is in the "moving" state, or in the "stationary" state, for example by using UE mobility history information (as available today). For example, if the UE has passed through several cells recently, eNB knows UE is moving; if the UE does not move cell for some time, eNB knows that the UE is stationary.

The UE may be assumed by the eNB to be mobile, and therefore handled in regular mode, if no history of mobility pattern is present in the MME.

When a nomadic UE attaches to the network, it may be assumed to be mobile and therefore in the "moving" state and handled in regular mode (i.e. assigned a PGW in the mobile Core Network).

In an embodiment, if the eNB detects the UE is stationary:
the eNB informs the MME that the UE is detected as stationary; because the EUTRAN may detect that the UE is stationary after a while, the eNB should be able to notify the MME at any time: this may be done either via adding an Information Element IE to an existing S1AP message (sent on the S1AP interface between eNB and MME) or by adding a new S1AP Notification message.

In another embodiment (and another aspect of the invention), an UE may indicate to the MME that it is a fixed UE: this may be done either via adding an Information Element IE to an existing NAS message (sent on the interface between UE and MME), e.g. Attach Request message, or by adding a new NAS message.

In another embodiment, the MME can get from the HSS (Home Subscriber Server) information indicating that an UE is fixed.

In another embodiment, the MME can also keep track of the last connected cells for the UE. If the last known cell to the MME has not changed for some time, the MME can detect the UE is stationary.

In an embodiment, once the MME knows (e.g. either from eNB, or UE, or HSS indication, or its own detection) that the UE is stationary or fixed:
the MME checks the UE has APN(s) (one or more APN) eligible for nomadic mode of operation
the MME selects the SGW/PGW for the APN(s) eligible for nomadic mode of operation to be collocated with the eNB.

In an embodiment, if there is a change in the mobility state of a nomadic UE, from moving to stationary:
once the MME knows this change (e.g. upon notification by the eNB), the MME causes the UE to detach and to reattach immediately (generally to the same cell)
When the UE reattaches, the MME selects the SGW/PGW for the APN(s) eligible for nomadic mode of operation to be collocated with the eNB (if the eNB has not changed upon attach), or if the eNB has changed the MME follows normal (currently specified) procedures.

Figure 2:
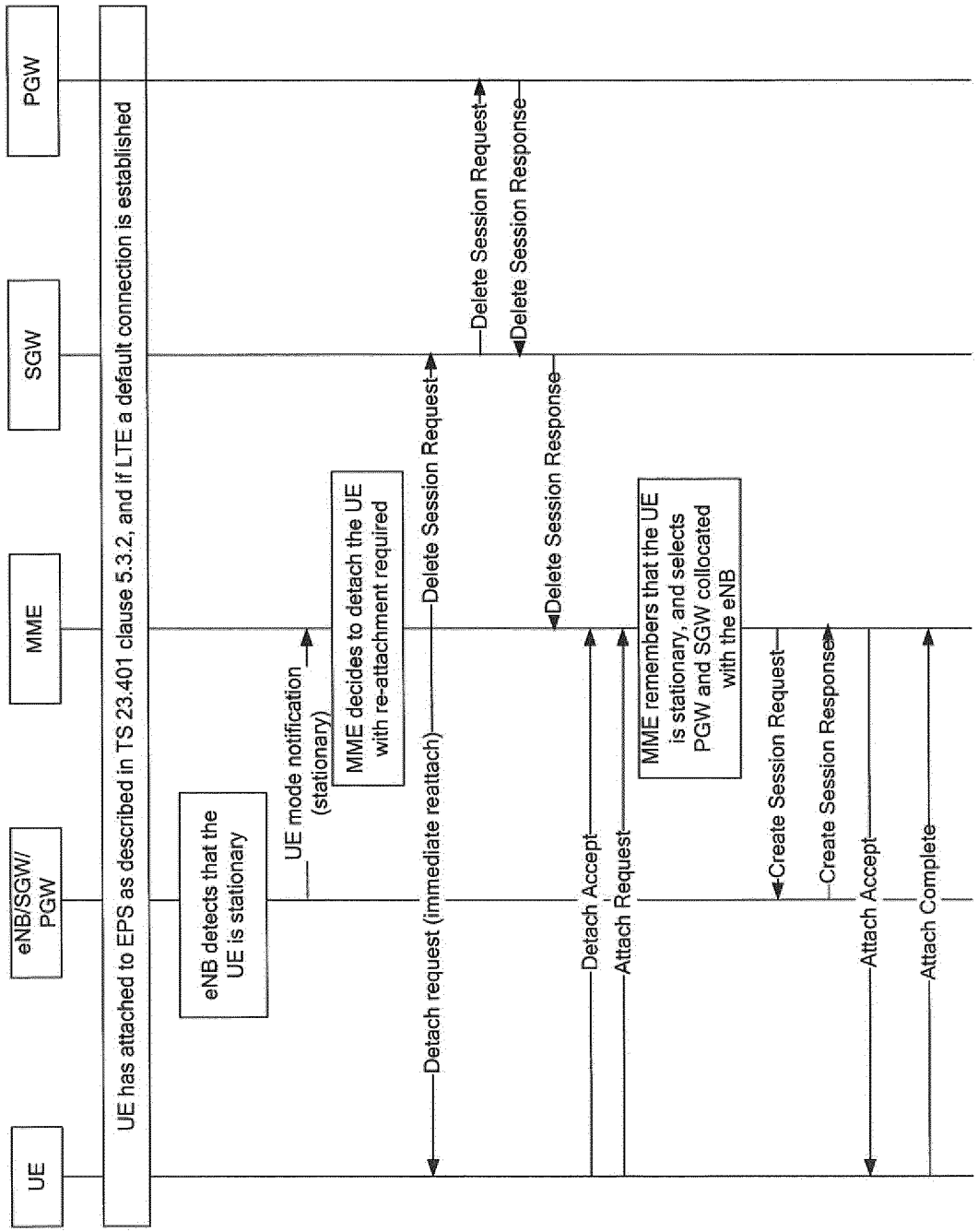
FIG. 2 is intended to illustrate, in a simplified way, an example of procedure for the support of nomadic users in EPS network according to an embodiment of the present invention.

For example, following steps may be performed as illustrated in FIG. 2, considering an example where a nomadic UE has attached to EPS and a default PDN connection has been established (as specified in 3GPP TS 23.401)

eNB detects that the UE is in stationary state
eNB notifies MME that the UE is in stationary state
MME decides to detach the UE with re-attachment required
MME sends a Detach Request (requesting immediate reattach) to the UE
MME sends a Delete Session Request to SGW
SGW sends a Delete Session Request to PGW
PGW sends a Delete Session Response to SGW
SGW sends a Delete Session Response to MME
UE sends a Detach Accept to MME
UE sends an Attach Request to MME
MME remembers that the UE is in stationary state, and selects PGW and SGW co-located with the eNB,
MME sends a Create Session Request to PGW/SGW
PGW/SGW sends a Create Session Response to MME
MME sends an Attach Accept to UE
UE sends an Attach Complete to MME.

In an embodiment, if there is a change in the mobility state of a nomadic UE, from stationary to moving:
once the MME knows this change (e.g. upon notification by the eNB), the MME causes the UE to detach and to reattach immediately
When the UE reattaches, the MME selects a PGW in the Mobile Core Network for all APNs, except LIPA (Local IP access) or SIPTO at local network APNs.

Figure 3:
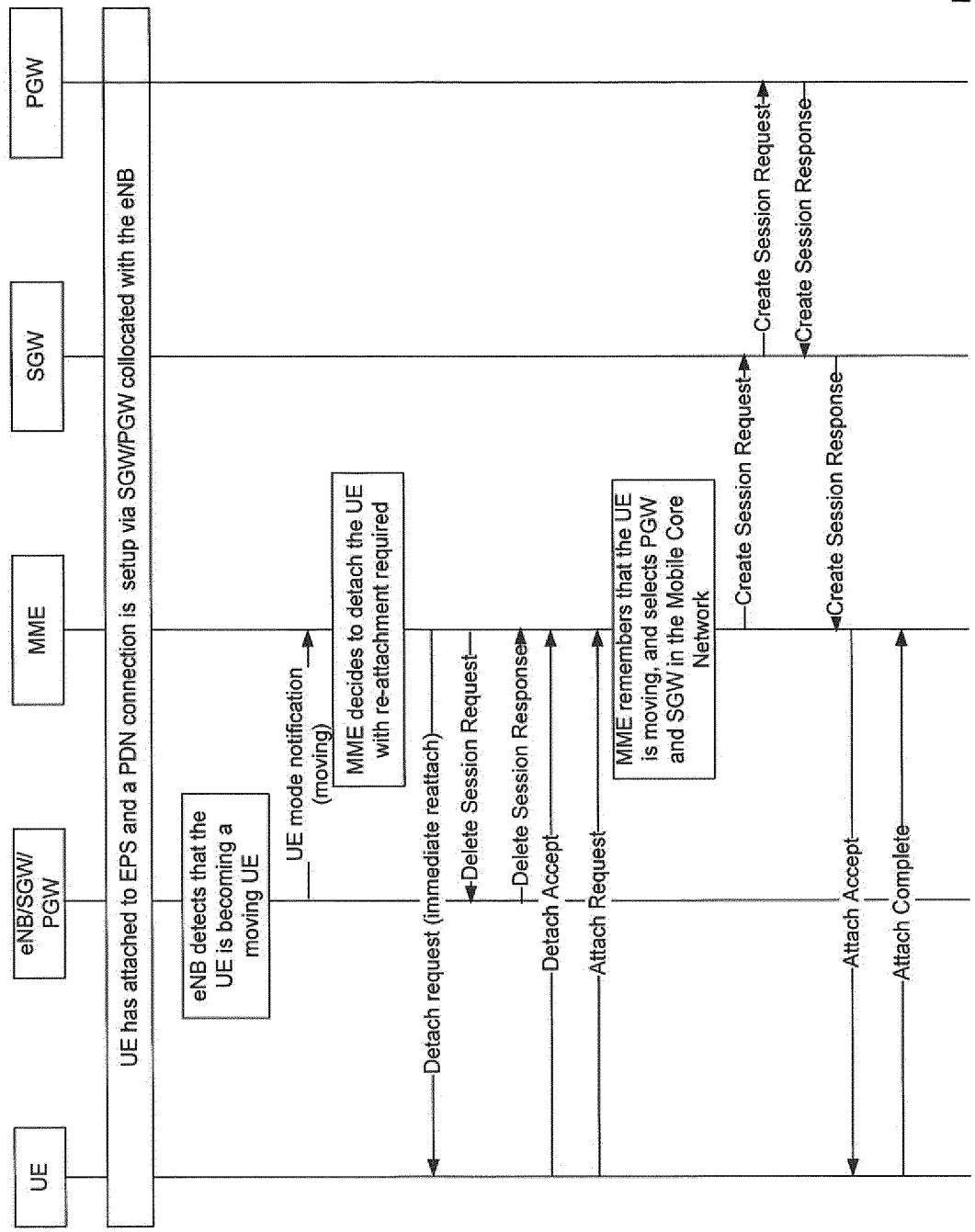
FIG. 3 is intended to illustrate, in a simplified way, another example of procedure for the support of nomadic users in EPS network according to an embodiment of the present invention.

For example, following steps may be performed as illustrated in FIG. 3, considering an example where an UE has attached to EPS and a PDN connection has been setup via SGW/PGW collocated with eNB:
eNB detects that the UE is moving
eNB notifies MME that the UE is moving
MME decides to detach the UE with re-attachment required
MME sends a Detach Request (immediate reattach) to the UE
MME sends a Delete Session Request to SGW/PGW collocated with eNB
SGW/PGW collocated with eNB sends a Delete Session Response to MME
UE sends a Detach Accept to MME
UE sends an Attach Request to MME
MME remembers that the UE is in moving state, and selects PGW and SGW in the mobile Core Network,
MME sends a Create Session Request to SGW in the mobile Core Network
SGW in the mobile Core Network sends a Create Session Request to PGW in the mobile Core Network
PGW in the mobile Core Network sends a Create Session Response to SGW in the mobile Core Network
MME sends an Attach Accept to UE
UE sends an Attach Complete to MME.

As indicated above, embodiments of the present invention may apply to systems other than EPS, for example UMTS, with the RNC replacing the eNB, the SGSN replacing the MME and the GGSN/PGW replacing the PGW. Embodiments of the present invention are applicable to both GPRS Core (Gn-SGSN without SGW) and EPC Core (S4-SGSN with SGW).

In one aspect, there is provided a method for the support of nomadic or fixed users in a mobile network.

Various embodiments are provided, which may be taken alone or in combination, according to various combinations.

In an embodiment, said mobile network comprising a Core Network CN accessed by a Radio Access Network RAN, and said mobile network providing connectivity referred to as PDN connectivity between an User Equipment UE and at least one external network referred to as Packet Data Network PDN, via a selected one of mobile network nodes associated with said PDN and referred to as PDN Gateway PDN GW, said method includes support of a nomadic or fixed user in a mode of operation referred to as non-mobile mode of operation wherein said selected PDN GW referred to as local PDN GW is co-located with a RAN node serving said UE, based on knowledge of the user's mobility pattern.

In an embodiment, said knowledge of the user's mobility pattern includes knowledge that the UE is in a mobility state referred to as stationary state wherein the UE is not moving for a least a given period of time, or that the user is a fixed user.

In an embodiment, a nomadic user may be in one or other of two mobility states, one mobility state referred to as moving state wherein said nomadic user is moving, and one mobility state, referred to as stationary state wherein said nomadic user is not moving for at least a given period of time, said method including support of said nomadic user in said non-mobile mode of operation, in said stationary state.

In an embodiment, a nomadic user may be in one or other of two mobility states, one mobility state referred to as moving state wherein said nomadic user is moving, and one mobility state referred to as stationary state wherein said nomadic user is not moving for at least a given period of time, said method including support of said nomadic user in a mode of operation referred to as mobile mode of operation wherein a selected PDN GW is located in said CN, in said moving state.

In an embodiment, said support includes support of said nomadic user in said mobile mode of operation, at attach of said UE to said mobile network.

In an embodiment, said support includes support of said user in said non-mobile mode of operation, for connectivity to at least one PDN represented by an Access Point Name APN that is eligible for said non-mobile mode of operation.

In an embodiment, said method comprises the steps of:
if the UE is in a mobility state referred to as stationary state wherein the UE is not moving for a least a given period of time, or if the user is a fixed user, checking if the UE has at least one Access Point Name APN representing a PDN, that is eligible for said non-mobile mode of operation,
if said APN is eligible for said non-mobile mode of operation, selecting said local PDN GW for PDN connectivity to said PDN.

In an embodiment, said method comprises the steps of:
if there is a change in the mobility state of the UE, from a moving state wherein the UE is moving, to a stationary wherein the UE is not moving for at least a given period of time, causing said UE to detach and re-attach to said mobile network,
when said UE re-attaches to said mobile network, selecting said local PDN GW, for PDN connectivity to at least one PDN represented by an APN eligible for said non-mobile mode of operation.

In an embodiment, said method comprises the steps of:
if there is a change in the mobility state of the UE, from a stationary state wherein the UE is not moving for at least a given period of time, to a moving state wherein the UE is moving, causing said UE to detach and re-attach to said mobile network,
when said UE re-attaches to said mobile network, selecting a PDN GW located in said CN, in a mode of operation referred to as mobile mode of operation.

In an embodiment, said method comprises a step of:
a mobile network node such as CN node having control plane functions, selecting said local PDN GW for said non-mobile mode of operation, based on said knowledge of the user's mobility pattern.

In an embodiment, said method comprises a step of:
a mobile network node such as RAN node, or CN node having control plane functions, estimating said user's mobility pattern.

In an embodiment, said estimation of said user's mobility pattern includes estimation of one of:
the UE is in a mobility state, referred to as stationary state, wherein the UE is not moving for at least a given period of time,
the mobility state of the UE changes from a mobility state referred to as moving state wherein the UE is moving, to said stationary state,
the mobility state of the UE changes from said stationary state to said moving state.

In an embodiment, said method comprises a step of:
a mobile network node such as RAN node informing a mobile network node such as CN node having control plane functions, of an estimated user's mobility pattern.

In an embodiment, said information indicates one of:
the UE is in a mobility state referred to as stationary state, wherein said UE is not moving for at least a given period of time,
the mobility state of the UE changes from a mobility state referred to as moving state wherein said UE is moving, to said stationary state,
the mobility state of the UE changes from said stationary state to said moving state.

In an embodiment, said method comprises a step of:
said mobile network node such as RAN node providing said information in a message, or Information Element in a message, sent to said CN node according to a signaling protocol at the interface between said RAN node and said CN node.

In an embodiment, said method comprises a step of:
the UE indicating to a mobile network node such as CN node having control plane functions, that the user is a fixed user.

In an embodiment, said method comprises a step of:
said UE providing said indication in a message, or Information Element of a message, sent to said CN node according to a Non Access Stratum signaling protocol between said UE and said CN node.

In an embodiment, said method comprises a step of:
a mobile network entity such as mobile subscriber database, sending to a mobile network node such as CN node having control plane functions, subscriber information indicating that the user is a fixed user.

In an embodiment, said method comprises a step of:
a mobile network node such as CN node having control plane functions, causing the UE to detach and re-attach to the mobile network, if there is a change in the UE mobility state, from a moving state wherein the UE is moving, to a stationary state wherein the UE is not moving for at least a given period of time, or a change from stationary state to moving state.

In an embodiment, said method comprises a step of:
a mobile network node such as CN node having control plane functions, checking if the UE has at least one Access Point Name APN representing a PDN, that is eligible for said non-mobile mode of operation.

In another aspect, there is provided a method for the support of fixed users in a mobile network.

Various embodiments are provided, which may be taken alone or in combination, according to various combinations.

In an embodiment, said mobile network providing connectivity to an User Equipment UE and comprising at least one Core Network CN node having control plane functions, said control plane functions including interacting with said UE in the control plane, said method comprises a step of:
said UE indicating to said CN node if the user is a fixed user.

In an embodiment, said method comprises a step of:
said UE providing said indication in a message, or Information Element of a message, sent to said CN node according to Non Access Stratum NAS signaling protocol between said UE and said CN node.

In an embodiment:
said message corresponds to an Attach Request message.

In an embodiment, said mobile network providing connectivity between an User Equipment UE and at least one external network referred to as Packet Data Network PDN, via a selected one of mobile network nodes associated with said PDN and referred to as PDN Gateway PDN GW, said method comprises a step of:
said CN node using said information for said selection of a PDN GW.

In another aspect, there is provided a method for the support of nomadic users in a mobile network.

Various embodiments are provided, which may be taken alone or in combination, according to various combinations.

In an embodiment, said mobile network providing connectivity to an User Equipment UE and comprising at least one Core Network CN node having control plane functions, said control plane functions including interacting with a Radio Access Network RAN node in the control plane, said method comprises a step of:
said RAN node informing said CN node of an estimated user's mobility pattern.

In an embodiment, said information indicates one of:
the UE is in a mobility state referred to as stationary state, wherein said UE is not moving for at least a given period of time,
the mobility state of the UE changes from a mobility state referred to as moving state wherein said UE is moving, to said stationary state,
the mobility state of the UE changes from said stationary state to said moving state.

In an embodiment, said method comprises a step of:
said RAN node providing said information in a message, or Information Element in a message, sent to said CN node according to a signaling protocol at the interface between said RAN node and said CN node.

In an embodiment, said mobile network providing connectivity between an User Equipment UE and at least one external network referred to as Packet Data Network PDN, via a selected one of mobile network nodes associated with said PDN and referred to as PDN Gateway PDN GW, said method comprises a step of:
said CN node using said information for said selection of a PDN GW.

In other aspects, there are provided entities configured for carrying out such method(s), said entities including, in particular (though not exclusively), User Equipment UE, and mobile network nodes such as:
RAN node (such as eNodeB for E-UTRAN or RNC for UTRAN),
CN node having control plane functions (such as MME for EPS, Gn-SGSN for UMTS CN based on GPRS, S4-SGSN for UMTS CN based on EPC), PDN Gateway (such as PGW for EPS, GGSN for UMTS CN based on GPRS, or PGW for UMTS CN based on EPC).

A person of skill in the art would readily recognize that steps of various above-described methods can be performed by programmed computers. Herein, some embodiments are also intended to cover program storage devices, e.g., digital data storage media, which are machine or computer readable and encode machine-executable or computer-executable programs of instructions, wherein said instructions perform some or all of the steps of said above-described methods. The program storage devices may be, e.g., digital memories, magnetic storage media such as a magnetic disks and magnetic tapes, hard drives, or optically readable digital data storage media. The embodiments are also intended to cover computers programmed to perform said steps of the above-described methods.

The invention claimed is:

1. A method comprising:
   (i) receiving a notification of a change in a mobility state of a user equipment in a mobile network, from a moving state wherein the user equipment is moving, to a stationary state wherein the user equipment is not moving for at least a given period of time;
   instructing, in response to receiving the notification, the user equipment to detach and immediately re-attach to the mobile network;
   sending, in response to receiving the notification, a delete session request towards a serving packet data network gateway in a core network;
   selecting, in response to receiving an attach request when the user equipment re-attaches to the mobile network, a local packet data network gateway co-located with a radio access network node serving the user equipment, wherein the local packet data network gateway is selected based on at least one access point name eligible for a non-mobile mode of operation of the user equipment; and
   (ii) receiving a second notification of a change in the mobility state of the user equipment in the mobile network, from the stationary state wherein the user equipment is not moving for at least a given period of time, to the moving state wherein the user equipment is moving;
   instructing, in response to receiving the second notification, the user equipment to detach and immediately re-attach to the mobile network;
   sending, in response to receiving the second notification, a delete session request towards the local packet data network gateway co-located with the radio access network node;
   selecting, in response to receiving an attach request when the user equipment re-attaches to the mobile network and based on the second notification, the serving packet data network gateway located in the core network for any access point name, except access point names requiring selection of the local packet data network gateway.

2. An apparatus comprising:
   at least one processor; and
   at least one memory including computer program code;
   the at least one memory and the computer program code configured to, with the at least one processor, cause the apparatus at least to:
   (i) receive a notification of a change in a mobility state of a user equipment in a mobile network, from a moving state wherein the user equipment is moving, to a stationary state wherein the user equipment is not moving for at least a given period of time,
   instruct, in response to receiving the notification, the user equipment to detach and immediately re-attach to the mobile network;
   send, in response to receiving the notification, a delete session request towards a serving packet data network gateway in a core network;
   select, in response to receiving an attach request when the user equipment re-attaches to the mobile network, a local packet data network gateway co-located with a radio access network node serving the user equipment, wherein the local packet data network gateway is selected based on at least one access point name eligible for a non-mobile mode of operation of the user equipment; and
   (ii) receive a second notification of a change in the mobility state of the user equipment, in the mobile network, from the stationary state wherein the user equipment is not moving for at least a given period of time, to the moving state wherein the user equipment is moving
   instruct, in response to receiving the second notification, the user equipment to detach and immediately re-attach to the mobile network;
   send, in response to receiving the second notification, a delete session request towards the local packet data network gateway col-located with the radio access network node;
   select, in response to receiving an attach request when the user equipment re-attaches to the mobile network and based on the second notification, the serving packet data network gateway located in the core network for any access point name, except access point names requiring selection of the local packet data network gateway.

3. The apparatus according to claim 2, wherein the apparatus comprises a core network node having control plane functions.

\* \* \* \* \*